United States Patent

Ballestra et al.

[11] 3,884,643
[45] May 20, 1975

[54] DEVICE FOR PERFORMING HIGHLY EXOTHERMIC REACTIONS

[76] Inventors: Mario Ballestra, Corso Buenos Aires 92; Domenico Triberti, Via Burlamacchi 11, both of Milan, Italy

[22] Filed: Feb. 22, 1972

[21] Appl. No.: 228,409

Related U.S. Application Data

[62] Division of Ser. No. 713,401, March 15, 1968, abandoned.

[52] U.S. Cl. ............... 23/285; 23/283; 23/260; 261/121 R; 261/154; 260/505 R
[51] Int. Cl. .................................... B01j 1/00
[58] Field of Search ...... 23/285, 283, 260; 261/112, 261/154, 121 R

[56] References Cited
UNITED STATES PATENTS

| | | | |
|---|---|---|---|
| 2,095,338 | 10/1937 | Luther et al. | 23/285 UX |
| 2,385,200 | 9/1945 | Friedel | 23/283 X |
| 2,776,820 | 1/1957 | Bond, Jr. | 23/283 UX |
| 3,427,342 | 2/1969 | Brook et al. | 23/283 X |
| 3,511,615 | 5/1970 | Roget et al. | 23/283 |

Primary Examiner—James H. Tayman, Jr.
Attorney, Agent, or Firm—Robert E. Burns; Emmanuel J. Lobato; Bruce L. Adams

[57] ABSTRACT

Reaction between a liquid reagent and a gaseous reagent wherein at least one of the products is a liquid is carried out by first mixing the liquid reagent with liquid product, so that the reaction with the gaseous reagent is carried out while the liquid reagent is in a solution of the liquid product. The mixture of liquid reagent and liquid product is contacted with the gaseous reagent while the liquid mixture is in rapid circulation. The device for carrying out an exothermic reaction between a gaseous reagent and a liquid compound, wherein at least one of the products of the reaction is liquid is provided with means for mixing the liquid reagent with the liquid product, at least one reaction conduit connected to the mixing means wherein the liquid mixture is put into rapid circulation and into contact with the gaseous reagent, means for controlling the temperature of the reaction conduit and means for feeding the gaseous reagent into the reaction conduit.

14 Claims, 8 Drawing Figures

PATENTED MAY 20 1975 3,884,643

DEVICE FOR PERFORMING HIGHLY EXOTHERMIC REACTIONS

This is a division of application Ser. No. 713,401, filed Mar. 15, 1968, now abandoned.

BACKGROUND OF THE INVENTION

The present invention concerns a device for performing highly exothermic reactions, in particular the present invention relates to a device suitable for sulphating and sulphating sulphonatable or sulphatable organic substances by means of gaseous sulphur trioxide.

Processes and devices for such purposes are already known. A previous invention disclosed in U.S. Pat. No. 3,198,849 involves fractioning of the reaction into a series of steps through several reaction chambers arranged in cascade, to which the gaseous reagent flows in parallel, generally in decreasing proportion of the amount required for the complete reaction.

An arrangement of this kind may possibly be applied to the present invention, in which case the process and device of the present invention are used in each step to perform a partial reaction which is completed in the following steps.

In the case of highly exothermic reactions, the capacity of an installation is limited mainly by the quantity of heat, per unit of time which can be removed from the heat exchange surfaces of the chamber, wherein the reaction is carried out.

SUMMARY OF THE INVENTION

An object of the present invention is to provide a particularly economical device for carrying out an exothermic reaction between a liquid and a gas. A further object of this invention is the provision of a device for carrying out exothermic reactions between a gaseous reagent and a liquid reagent having a high production capacity and a low installation cost.

According to the present invention, an increased capacity for the removal of heat per unit of time from the reaction zones is achieved mainly by causing a mixture of liquid product and liquid starting material to pass through the reaction zone at high speed.

The device according to the invention comprises means for mixing the liquid product of the reaction and liquid reagent, at least one reaction conduit wherein the mixture of the liquid product of reaction and the liquid reagent are forced to rapid circulation, means for introducing the gaseous reagent into said conduit, into contact with and preferably in concurrent flow with said liquid mixture and a chamber for separating the liquid and gaseous products of the reaction. The conduit wherein the reaction occurs is provided with temperature controlling means. For carrying out exothermic reactions, liquid cooling means which surround the reaction conduit are preferred.

It has been found that the device of the invention is advantageous for carrying out highly exothermic reactions between at least two reagents, one of which is in the liquid phase and one of which is in the gaseous phase, and wherein the reaction yields at least one liquid product.

DESCRIPTION OF THE PREFERRED EMBODIMENTS

Figure 1:
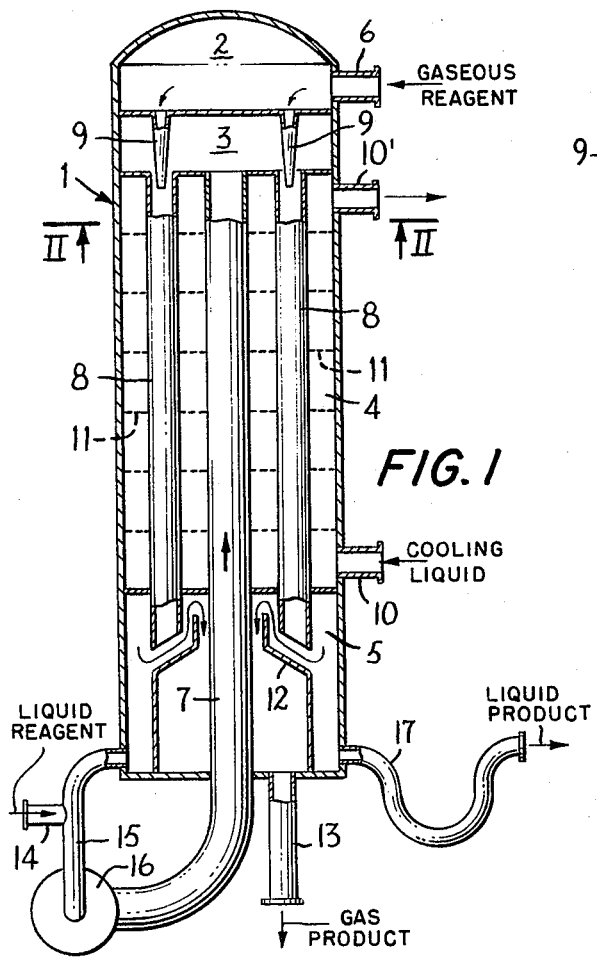
FIG. 1 shows a vertical, longitudinal section of a device of the invention.

Sulphonation and sulphation reactions wherein sulphur trioxide is reacted with a liquid organic reagent such as alkarylic hydrocarbon, for example, dodecylbenzene, and aliphatic alcohols, for example lauryl alcohol are exothermic reactions which may be carried out advantageously by means of the present device. The sulphonation and sulphation of technical mixtures of such compounds, which are commonly used for the production of synthetic detergents and the like may also be carried out advantageously in the device of this invention.

The device of this invention may, of course, be used to carry out other types of exothermic reactions, particularly exothermic reactions between at least one gaseous and one liquid reactant. For example, chlorinations may also be advantageously carried out according to this invention. In this case the gaseous reagent is chlorine, while the liquid reagent is an organic compound and preferably, a paraffins, olefin and/or an aromatic compound and other similar chlorinatable organic compounds and mixtures thereof.

According to this invention, the device for carrying out processes of the above type is provided with means for mixing the liquid product of reaction with the liquid reagent. The device is equipped with means for recycling at least a portion of the liquid product into a mixing chamber or conduit, where liquid product is mixed with fresh liquid reagent. The liquid mixture of product and reagent is then transferred, preferably by means of a pump into the one or more reaction conduits of the device. A manifold arrangement is provided at the outlet of the mixing conduit; reaction conduit or conduits extend from the manifold and outlet into a separation chamber where the gaseous material is separated from the liquid. Thus the mixing conduit and the reaction conduit are passed through in opposite directions by the liquid mixture.

In a preferred embodiment of the invention the device contains a plurality of reaction conduits each of which extend from the manifold. In the device of this invention which is provided with a plurality of reaction conduits, the manifold arrangement is effective to distribute the liquid mixture moving from the mixing conduit uniformily into each of the reaction conduits.

The mixing and reaction conduits are surrounded by a single cylindric casing or housing. The temperature inside the reaction conduit and also if desired the mixing conduit can be controlled by passing a liquid at the desired temperature through the cylinder casing, which is provided with deflecting walls, baffles, and the like to cause the liquid to flow along a suitable path and to surround the conduits. By causing cooling liquid to flow through the cylinder casing at a rather rapid rate, a large amount of heat can be removed from the reaction conduits, through which the fluid reaction mixture is also circulating rapidly.

In preferred embodiment of this invention, the reaction conduits and the mixing conduit are substantially rectilinear and vertical and positioned substantially parallel to each other; the position of the mixing conduit with respect to the reaction conduits are such as to allow, through the distribution manifold, a uniform inflow of the liquid mixture of the liquid reaction product and the liquid reagent from the mixing conduit to the various reaction conduits.

While the reaction conduit and the mixing conduits are usually in a substantially vertical position, they may also be in an inclined or in a horizontal position.

Figures 4, 5, 6:
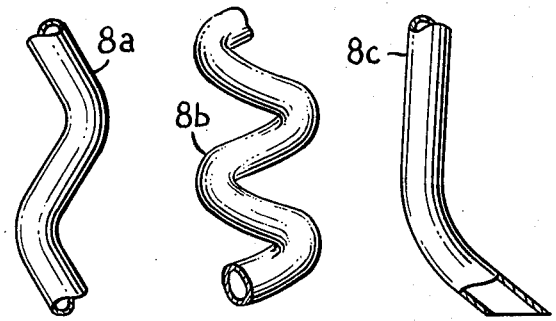
FIGS. 4, 5 and 6 are each fragmentary side views of reaction conduits which can be used in the device of the invention.

Further, the reaction conduits and possibly also said recycle and mixing conduit, may have a zig zag, worm-like, spiral, and the like shape. Also, the conduits may have a partially or intermittent zig zag, worm-like, spiral or the like shape, i.e., the shape may be intermittently worm-like, changing at intervals to an ordinary rectilinear type tube shape and so forth. FIGS. 4 and 5 illustrate some alternate forms of the reaction conduits of the present device.

Figure 7:
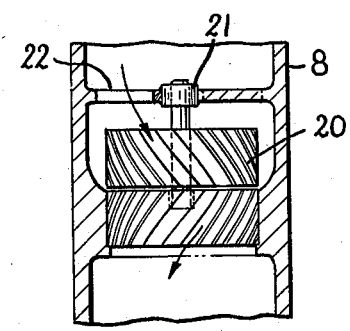
FIG. 7 is an enlarged fragmentary cross section of a reaction conduit showing a conduit provided with agitation means.

The reaction conduits may also be provided with agitation means as is illustrated in FIG. 7, to provide more intimate mixing of the gaseous reagent with the liquid mixture.

The separation chamber of the device of this invention is provided with at least one outlet for recycling a portion of the liquid reaction product which is to be mixed with the liquid reagent, and at least a second outlet conduit for discharging the gaseous material which may be constituted by the inert components of the gaseous reagent. Preferably, the outlet conduits for the gaseous material is arranged in the upper portion of the separation chambers. At least one more outlet conduit is provided for discharging the remaining portion of the liquid reaction product. The outlet for the reaction product which is not to be recycled may be connected in series with a second similar elements when the device comprises several elements of this type as will be described below.

Preferably, the outlet ends of the reaction conduits project into the separation a chamber and are suitably directed so as to cause a rotation motion in the separation chamber which centrifuges the liquid mixture outwards of the chamber, thus allowing an easier removal of the gaseous reaction products from the central zone of the separation chamber. FIG. 6 illustrates a reaction conduit having a suitably directed outlet portion so as to cause the centrifugation of the liquid in the separation chamber.

The means for feeding the gaseous reagent in the device of this invention is preferably constituted by nozzles positioned coaxial to each reaction conduit. The nozzles may work as ejectors which draw the liquid mixture into the reaction conduit.

Figure 8:
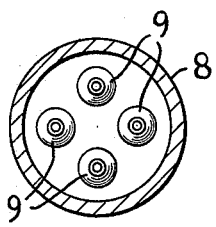
FIG. 8 is an enlarged cross section of a reaction conduit showing several nozzles for the introduction of gaseous reagent.

Further, each reaction conduit may be provided with several nozzles for feeding the gaseous reagent as is illustrated in FIG. 8; such nozzles are suitably arranged in the section or along the axis of the corresponding reaction conduit.

According to another embodiment of this invention more than one of the devices of the type already described is employed. When carrying out a reaction using a pluality of devices or elements the liquid reagent is fed in series into each element and the gaseous reagent is fed in parallel. In a particularly preferred embodiment using several elements, the liquid reagent is fed into the first element where it is contacted with only a fractional amount of the gaseous reagent required for complete reaction and then the mixture of unreacted liquid reagent and liquid reaction product is sent to a second element where it is again contacted with the gaseous reagent. The reaction may be completed in the second element or sent to a third element and so forth. The gaseous reagent is preferably fed in parallel in the desired amount into each of the elements except the first element wherein the gaseous material separated in the separation chamber of the last element and which still contains some unreacted gaseous reagent is employed.

Figure 2:
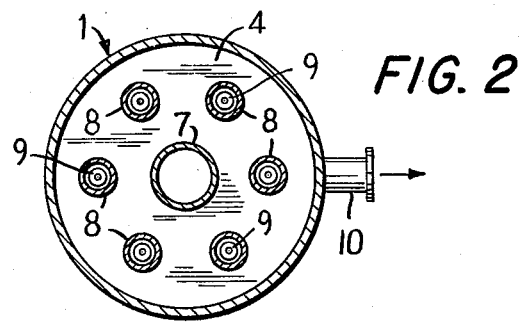
FIG. 2 is a section along plane II—II of FIG. 1.

The invention will be further described with reference to the drawings. With reference to FIGS. 1 and 2, the cylindric casing 1 has a vertical axis and is divided in a tranversal direction into four overlapped zones 2, 3, 4, 5. A distribution chamber 2 is provided for the gaseous reagent fed by a conduit 6. In the manifold 3, ends mixing-and-recycle conduit 7; also, reaction conduits 8 extend from manifold 3. Nozzles 9 projecting into the starting portion or inlet of conduits 8 are provided for feeding therein the gaseous reagent contained in zone 2. A cooling chamber 4 surrounds conduits 7 and 8 through which passes a cooling fluid fed by inlet and outlet elements 10 and 10' respectively. By means of suitable perforate diaphragms 11, the cooling liquid crosses the path of conduits 7 and 8 according to tranjectories suitably selected. A separation chamber 5 separates the liquid reaction product from the gaseous compounds possibly constituted by the inert components contained in the gaseous reagent; the gaseous compounds, which obviously layer in the upper portion of chamber 5, overpass the edge of the spillway 12 and are sucked through discharge conduit 13. A feeding conduit 14 for the liquid reagent opens into a first discharge conduit 15 for the liquid reaction product recycled from chamber 5; through a pump 16 the mixture of liquid reagent and liquid product is forced into the mixing-and-recycle conduit 7. Another outlet or discharge conduit is provided for the liquid reaction product, which leads to a stock deposit, or to an installation for subsequent treatment. As is evident from FIG. 1 and the foregoing description, conduit 15 provides means for discharging liquid reaction product, while feeding conduit 14 in combination with conduit 15 provide means for mixing the liquid reagent with the liquid reaction product.

The device works as follows: the liquid reagent is sent through conduit 14 where it mixes in conduit 15 with the reaction product drawn by the recycle pump 16. The liquid mixture moves up, pushed by pump 16 into the mixing-and-recycle conduit 7, wherein mixing between the reaction product and liquid reagent is completed. This mixture then moves down into all of the reaction conduits 8 into which the gaseous reagent is fed through nozzles 9. In chamber 5, the gaseous reaction products, consisting normally of the inert components of the gaseous reagent, are discharged through conduit 13. The liquid reaction product which is not sucked into conduit 15 by pump 16, is discharged from 17.

In the case where the amount of gaseous reagent fed through the inlet 6 is not sufficient to react with the entire amount of liquid reagent fed through the conduit 14, conduit 17 may be connected to a successive installation working in a similar manner and wherein a second fraction of gaseous reagent flows in parallel.

Figure 3:
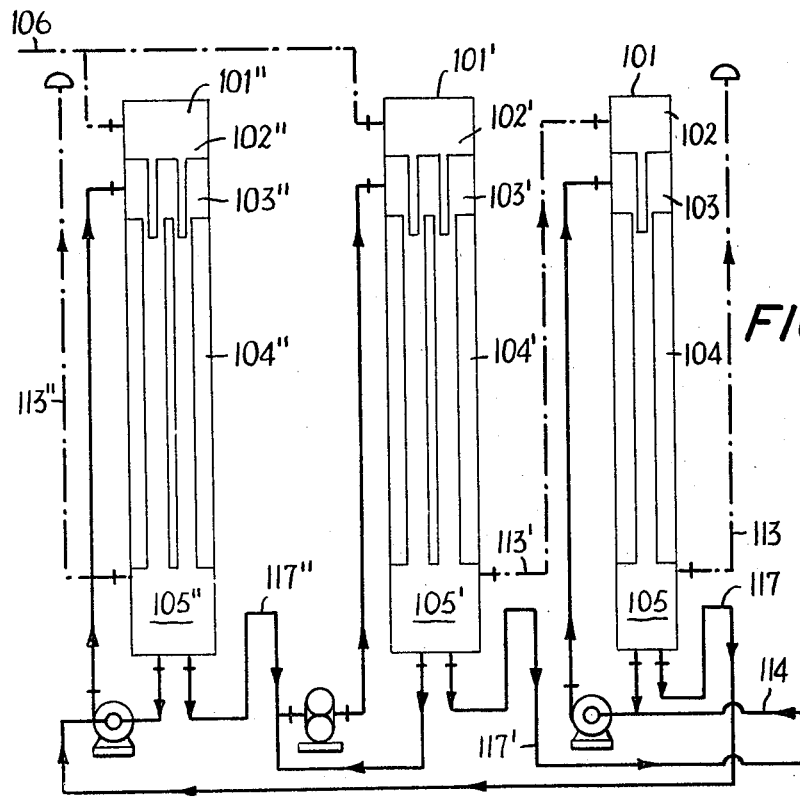
FIG. 3 shows an installation modification, according to the invention, using at least three devices of the kind shown in FIG. 1.

With reference to FIG. 3; the three cylindric casings of elements 101, 101' and 101'' each contain substantially an apparatus of the kind shown in FIGS. 1 and 2. Element 101 is separated into four overlapped zones 102, 103, 104 and 105, each of which have the same function as zones 2, 3, 4 and 5 of FIG. 1.

In the same way, elements 101' and 101'' are provided with zones 102', 103', 104' and 105' and 102'', 103'', 104'' and 105'' respectively.

The liquid reagent is supplied through conduit 114 and, after having partially reacted with the gaseous reagent exits, through conduit 117 mixed with a first fraction of reaction product. Then the liquid mixture passes into element 101'' and from here, through conduit 117'', into element 101' wherefrom, through conduit 117' exits only the liquid reaction product.

The gaseous reagent is fed in parallel through conduits 106 to chambers 102' and 102''. To zone 102 is sent the gaseous reagent which exits through conduit 113' from the separation zone 105' of element 101', thus the gaseous reagent sent to the first element 101, contains only a small percent of reagent remaining in the gaseous mixture after it has reacted with the liquid reagent in element 101'.

In this way, the beginning of the reaction, wherein fresh liquid reagent is supplied through conduit 114 serves to purify the almost exhausted gases coming from conduit 113'. Thus the gaseous products exiting from conduit 113 are completely free of gaseous reactant.

The gas exits from element 101' through conduit 113'', the reactant portion of this gas is normally substantially exhausted during contact with the mixture of liquid reactant and product contained in element 101''.

FIGS. 4 and 5 show some alternate shapes of the reaction conduit 8, reaction conduit 8a is a zig zag or worm-like shape and reaction conduit 8b is in the form of a spiral. FIG. 6 illustrates the end portion of a conduit 8c having an outlet which causes a rotation motion in the separation chamber.

In FIG. 7, a reaction conduit 8 is shown which is provided with agitation means, namely a turbine which cooperates to disperse the liquid and mix the liquid with the gaseous reagent. With respect to FIG. 7, the rotor 20 is rotatably supported by bearings 21 carried by suitable support 22 which extend accross the conduit 8.

The invention is further described by means of the following example which is set forth purely for purposes of illustrating the invention and must not be considered as limiting the scope thereof in any manner whatsoever.

EXAMPLE

Sulphonation of dodecylbenzene is carried out in a device of the kind illustrated in FIG. 1. The following operating conditions produce 500 kgs./hr. of dodecylbenzene sulphonic acid.

From conduit 6 are fed 123 kg/hr. of $SO_3$ contained in a gaseous mixture obtained directly from the combustion of sulphur followed by the catalytic conversion of $SO_2$ to $SO_3$; from conduit 14 are fed 378 kg./hr. of technical dodecylbenzene, which are mixed with the liquid produce of the reaction in conduit 15; the delivery of the recycle pump 16 is comprised between 5 and 25 $m^3$/h; therefore, in conduit 7 each part of dodecylbenzene is mixed with 10–50 parts of dodecylbenzene sulphonic acid; from conduit 17, 50 mg. of product are obtained per hour; the reaction temperature is maintained at about 65° C., by means of the circulation of cooling water which is fed through conduit 10 and discharged through conduit 10'.

From the above description, it may be noted that one of the advantages of the invention is the use of a great mass of liquid mixture constituted by the liquid reaction product and the liquid reagent in relation to the mass of the liquid reagent, which facilitates the solution of the gaseous reagent, and thus aids and increases the rate of reaction. Due to the high rate of solution of the gaseous reagent and thereby the high rate of reaction of the gaseous reagent, the gaseous compounds which separate in the separation chamber are mainly inert components, with which the gaseous reagent may have been mixed when fed to the reaction conduits.

In the process carried out in the present device the fraction of gaseous reagent which does not react is reduced to negligible quantities.

In the known sulphonation device wherein the gaseous reagent reacts with a thin layer of liquid reagent flowing on a heat exchange wall, it is necessary to feed a gaseous reagent in large excess in order to obtain reaction with a substantial portion of the liquid reactant. Further, in such a device, the gaseous reagent is fed at a relatively high speed with respect to the film of liquid reagent. For this reason, the gaseous reagent is fed under pressure, which causes problems in the installation, especially when the gaseous reagent is poisonous or highly corrosive as is usually the case.

A further advantage of the device is that the cooling, and generally the thermal regulation of the reaction product may be completed in the recycle circuit and in any event the cooling is greatly facilitated by the relatively high speed with which the liquid mixture travels through the reaction zone.

Although for reasons of describing the present invention some specific embodiments have been described and illustrated, these examples have been set forth by way of example only, and many modifications and variations may be made in embodying the invention. For instance, in the above description, a fluid cooling means which circulates outside the reaction conduits and the mixing conduit has been described. However, when the reaction product is to be maintained at a given temperature, such a fluid heat exchanging means may be used to maintain a controlled elevated temperature rather than to remove the heat of reaction. This fluid means may provide heat instead of absorbing the same.

In a different embodiment of this invention the temperature controlling means may be performed by chambers suitably thermally maintained by means other than heat exchanging means.

All said modifications, however, having to be considered as based on the following claims.

What we claim and desire to secure by Letters Patent is:

1. A device suitable for carrying out an exothermic reaction between a gaseous reagent and a liquid compound wherein at least one product of the reaction is liquid which comprises an elongated housing, a manifold in the upper end of said housing, a separation chamber in the lower end of said housing for separating gaseous material from said liquid product, at least one reaction conduit within said elongated housing providing fluid communication between said manifold and separation chamber, the inlet end of said reaction conduit being at said manifold and the outlet end of said reaction conduit being at said separation chamber, discharge means for discharging said liquid product from said separation chamber, mixing means connected to said discharge means for mixing liquid reagent with at least part of said liquid product discharged from said separation chamber, at least one mixing-and-recycle conduit inside said housing providing fluid communication between said mixing means and said manifold for mixing said liquid reagent and recycled liquid product and for circulating said liquid reagent and recycled liquid product from the bottom to the top of said mixing-and-recycle conduit so that said liquid reagent and recycled liquid product in admixture then flow into said reaction conduit, at least one nozzle coaxial to and at the inlet of said reaction conduct for feeding said gaseous reagent into said reaction conduit in concurrent flow relationship with the mixture of liquid reagent and recycled liquid product, and means for controlling the temperature of said reaction conduit.

2. A device according to claim 1, in which said elongated housing is cylindrical, said recycling-and-mixing conduit is coaxial with said cylindrical housing, a plurality of said reaction conduits extend from said manifold, the outlet ends of said reaction conduits project into said separation chamber and said temperature controlling means comprises a cooling liquid in contact with said reaction conduits and also in contact with said recycling-and-mixing conduit.

3. A device according to claim 1 in which a plurality of said reaction conduits extend from said manifold, and said outlet ends of said reaction conduits project inside said separation chamber and are suitably directed so as to cause the liquid mixture passing into said chamber from said reaction conduits to have a rotational motion, causing the liquid mixture to centrifuge outwards of said chamber, thus allowing the removal of the gaseous material from the central zone of said separation chamber.

4. A device according to claim 1 in which a plurality of said reaction conduits extend from said manifold.

5. A device according to claim 4 in which said temperature controlling means comprises a cooling liquid which flows through said housing in contact with said reaction conduits.

6. A device according to claim 4 in which said means for feeding said gaseous reagent comprises at least one nozzle arranged in the secton of each reaction conduit, said nozzles operating as ejectors which draw said liquid mixture into said reaction conduits.

7. A device according to claim 4 in which a plurality of said nozzles are arranged to feed the gaseous reagent into each reaction conduit.

8. A device according to claim 4 in which said reaction conduits and said mixing conduit are substantially rectilinear, vertical and parallel, the position of said mixing conduit with respect to the reaction conduits being such as to allow by means of said manifold a uniform inflow of said liquid mixture from said mixing-and-recycle conduit into the plurality of reaction conduits.

9. A device according to claim 4 in which said reaction conduits and said mixing-and-recycle conduits are in a non vertical position.

10. A device according to claim 4 in which said device also comprises means for agitating the mixture in said device also comprises means for agitating the mixture in said reaction conduits.

11. A device according to claim 4 in which said device also comprises a small turbine for each reaction conduit which cooperates in mixing the gaseous reagent with the liquid mixture.

12. A device suitable to carry out an exothermic reaction between a gaseous reagent and a liquid compound, wherein at least one product of the reaction is liquid which comprises an elongated cylindrical housing, a manifold in the upper end of said housing, a separation chamber in the lower end of said housing for separating a gaseous material from said liquid product, at least a reaction conduit providing fluid communication between said manifold and said separation chamber, discharge means for discharging said liquid product from said separation chamber, mixing means connected to said discharge means for mixing a liquid reagent with at least part of said liquid product discharged from said separation chamber, a recycling-and-mixing conduit coaxial with said cylindrical housing providing fluid communication between said mixing means and said manifold for mixing said liquid reagent and recycled liquid product and for circulating said liquid reagent and recycled liquid product from the bottom to the top of said mixing and recycle conduit so that said liquid reagent and recycled liquid product in admixture then flow into said reaction conduit, at least one nozzle coaxial to said reaction conduit for feeding said gaseous reagent into said reaction conduit in concurrent flow relationship with the mixture of liquid reagent and recycled liquid product, and a cooling liquid in contact with said reaction conduit and said recycling-and-mixing conduit for controlling the temperature of said reaction conduit, wherein the outlet end of said reaction conduit projects inside said separation chamber and is suitably directed so as to cause the liquid mixture passing into said separation chamber from said reaction conduit to have a rotational motion, causing the liquid mixture to centrifuge outwards of said separation chamber, thus allowing the removal of the gaseous material from the central zone of said separation chamber.

13. A device according to claim 12 which further comprises at least a second discharge conduit from the upper portion of said separation chamber for discharging the gaseous material and at least a third discharge conduit from said separation chamber for discharging the remaining portion of the liquid reaction product.

14. A device according to claim 12, which comprises a plurality of elements each comprising said housing, all of said means, said manifold, said reaction conduit, said recycle-and-mixing and said separation chamber and in which said device also comprises means for feeding in series into each element, except for the first of said elements, a mixture of liquid reagent and liquid reaction product, means for feeding the gaseous reagent in parallel to all elements except the first of said element and means for feeding to the first element said liquid reagent and the gaseous reagent obtained from the separation of the gaseous material in the separation chamber of the last element.

* * * * *